(12) United States Patent
Ammireddy et al.

(10) Patent No.: US 10,404,573 B2
(45) Date of Patent: Sep. 3, 2019

(54) EFFICIENT METHOD TO AGGREGATE CHANGES AND TO PRODUCE BORDER GATEWAY PROTOCOL LINK-STATE (BGP-LS) CONTENT FROM INTERMEDIATE SYSTEM TO INTERMEDIATE SYSTEM (IS-IS) LINK-STATE DATABASE

(71) Applicant: Telefonaktiebolaget LM Ericsson (publ), Stockholm (SE)

(72) Inventors: Amarnath Ammireddy, San Jose, CA (US); Uma S. Chunduri, Fremont, CA (US); Vasant S. Patil, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/089,112

(22) PCT Filed: May 27, 2016

(86) PCT No.: PCT/IB2016/053149
§ 371 (c)(1),
(2) Date: Sep. 27, 2018

(87) PCT Pub. No.: WO2017/168216
PCT Pub. Date: Oct. 5, 2017

(65) Prior Publication Data
US 2019/0132232 A1    May 2, 2019

Related U.S. Application Data

(60) Provisional application No. 62/314,293, filed on Mar. 28, 2016, provisional application No. 62/314,284, filed on Mar. 28, 2016.

(51) Int. Cl.
*H04L 12/28* (2006.01)
*H04L 12/755* (2013.01)
*H04L 12/741* (2013.01)
*H04L 12/715* (2013.01)
*H04L 12/751* (2013.01)
*H04J 1/16* (2006.01)

(52) U.S. Cl.
CPC ............ *H04L 45/021* (2013.01); *H04L 45/02* (2013.01); *H04L 45/04* (2013.01); *H04L 45/54* (2013.01)

(58) Field of Classification Search
CPC ....... H04L 45/02; H04L 45/04; H04L 45/021; H04L 45/54
(Continued)

(56) References Cited

U.S. PATENT DOCUMENTS 5,128,926 A      7/1992  Perlman et al.
9,210,067 B1 *  12/2015  Agarwal ................. H04L 45/22
(Continued)

OTHER PUBLICATIONS

Gredler, et al., "North-Bound Distribution of Link-State and TE Information using BGP; draft-ietf-idr-ls-distribution-13," IETF Inter-Domain Routing Internet-Draft, https://tools.ietf.org/html/draft-ietf-idr-ls-distribution-13, Oct. 16, 2015, 47 pages.
(Continued)

*Primary Examiner* — John Pezzlo
(74) *Attorney, Agent, or Firm* — Sage Patent Group

(57) ABSTRACT

A method is implemented by a network device functioning as a Border Gateway Protocol (BGP) speaker to transmit aggregated link-state information pertaining to a network in which the network device operates to a peer BGP speaker. The method includes storing, in a link-state database, node entries representing nodes in the network, fragment entries representing fragments received from nodes in the network, and link/prefix entries representing links/prefixes in the network. Each link/prefix entry is assigned a state from a possible set of states, where the possible set of states include a new entry state, a modified entry state, a deleted entry state, and an unmodified entry state. The method further includes determining link-state information to transmit to the peer BGP speaker based on a state assigned to a
(Continued)

link/prefix entry, and transmitting the determined link-state information to the peer BGP speaker.

25 Claims, 11 Drawing Sheets

(58) Field of Classification Search
USPC .......................................... 370/252, 386, 389
See application file for complete search history.

(56) References Cited

U.S. PATENT DOCUMENTS

| | | |
|---|---|---|
| 2002/0165981 A1 | 11/2002 | Basturk et al. |
| 2004/0120355 A1* | 6/2004 | Kwiatkowski .......... H04L 45/02 370/506 |
| 2011/0026533 A1 | 2/2011 | Nalawade |

OTHER PUBLICATIONS

Previdi, et al., "BGP Link-State extensions for Segment Routing; draft-gredler-idr-bgp-ls-segment-routing-ext-01," IETF, Inter-Domain Routing Internet-Draft, https://tools.ietf.org/id/draft-gredler-idr-bgp-ls-segment-routing-ext-01.txt; Dec. 14, 2015, 31 pages.

Previdi, et al., "IS-IS Traffic Engineering (TE) Metric Extensions; draft-ietf-isis-te-metric-extensions-07," IETF Networking Working Group Internet-Draft, https://tools.ietf.org/html/draft-ietf-isis-te-metric-extensions-07, Jun. 16, 2015, 17 pages.

RFC 1771: Rekhter, et al., "A Border Gateway Protocol 4 (BGP-4)," Network Working Group, Request for Comments 1771, Mar. 1995, 57 pages.

* cited by examiner

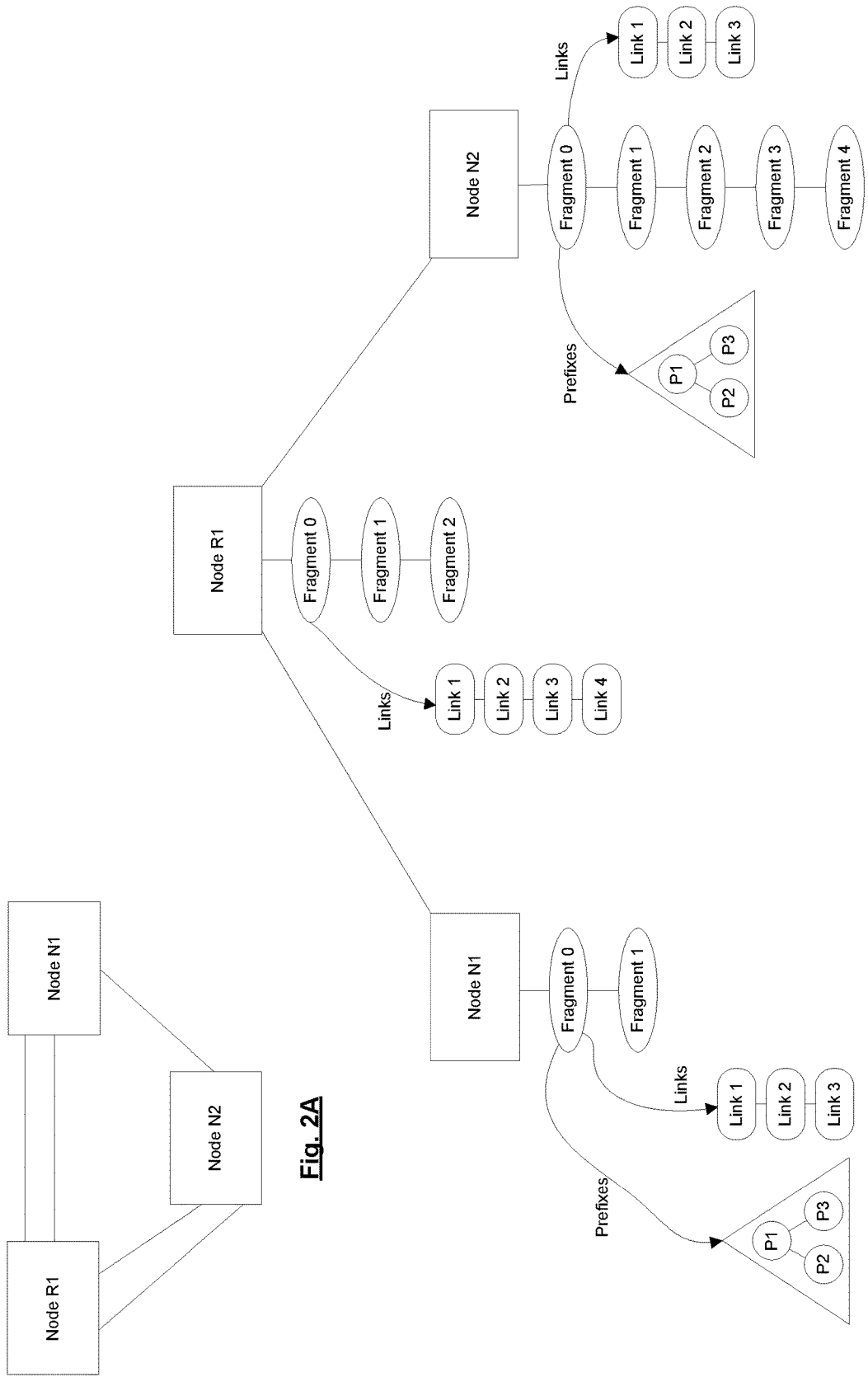

EFFICIENT METHOD TO AGGREGATE CHANGES AND TO PRODUCE BORDER GATEWAY PROTOCOL LINK-STATE (BGP-LS) CONTENT FROM INTERMEDIATE SYSTEM TO INTERMEDIATE SYSTEM (IS-IS) LINK-STATE DATABASE

CROSS-REFERENCE TO RELATED APPLICATIONS

This application is a national stage of International Application No. PCT/IB2016/053149, filed May 27, 2016, which claims the benefit of U.S. Provisional Application No. 62/314,284, filed Mar. 28, 2016, and U.S. Provisional Application No. 62/314,293, filed Mar. 28, 2016, which are hereby incorporated by reference.

TECHNICAL FIELD

Embodiments of the invention relate to the field of computer networks; and more specifically, to maintaining link-state information in a link-state database to efficiently provide aggregated link-state information via Border Gateway Protocol Link-State (BGP-LS).

BACKGROUND

Border Gateway Protocol (BGP) is a protocol for exchanging routing and reachability information between autonomous systems (ASes). An AS is a set of routers under a single technical administration. An AS typically employs an interior gateway protocol (IGP) to exchange network topology information among routers within the AS. Examples of IGPs include link-state routing protocols such as Intermediate System to Intermediate System (IS-IS) and Open Shortest Path First (OSPF).

Border Gateway Protocol Link-State (BGP-LS) uses BGP as a carrier for network topology and reachability information collected by an IGP. BGP-LS allows a BGP speaker to share network topology and reachability information collected by the BGP speaker (e.g., link-state information collected using IS-IS or OSPF) with a peer BGP speaker (e.g., another BGP speaker located in another AS) via BGP. For this purpose, BGP-LS defines a link-state network layer reachability information (NLRI) encoding format that is used to provide network topology and reachability information to external components. Each link-state NLRI may describe either a node, a link, or a prefix.

Support for BGP-LS adds non-trivial overhead to IGP operation in terms of processing and identifying changes in the link-state database. This is made worse in situations where the IGP continuously receives updated link-state information, for example, due to frequently changing traffic engineering (TE) data. The continuous updates may cause the IGP to relay excessive amounts of link-state information to the peer BGP speaker, which can lead to further churn and potentially impact the entire network.

SUMMARY

A method is implemented by a network device functioning as a Border Gateway Protocol (BGP) speaker to transmit aggregated link-state information pertaining to a network in which the network device operates to a peer BGP speaker. The method includes storing, in a link-state database, node entries representing nodes in the network, fragment entries representing fragments received from nodes in the network, and link/prefix entries representing links/prefixes in the network. Each node entry is associated with a set of fragment entries and each fragment entry is associated with a set of link/prefix entries. Each fragment entry and link/prefix entry is assigned a version number and each link/prefix entry is assigned a state from a possible set of states, where the possible set of states include a new entry state, a modified entry state, a deleted entry state, and an unmodified entry state. The method further includes determining link-state information to transmit to the peer BGP speaker based on a state assigned to a link/prefix entry and transmitting the determined link-state information to the peer BGP speaker.

A network device is configured to function as a Border Gateway Protocol (BGP). The network device is to transmit aggregated link-state information pertaining to a network in which the network device operates to a peer BGP speaker. The network device includes a link-state database to store link-state information pertaining to a network in which the network device operates. The network device further includes a set of one or more processors and a non-transitory machine-readable storage medium having stored therein a link-state module. The link-state module, when executed by the set of one or more processors, causes the network device to store, in a link-state database, node entries representing nodes in the network, fragment entries representing fragments received from nodes in the network, and link/prefix entries representing links/prefixes in the network, where each node entry is associated with a set of fragment entries and each fragment entry is associated with a set of link/prefix entries, and where each fragment entry and link/prefix entry is assigned a version number and each link/prefix entry is assigned a state from a possible set of states, where the possible set of states include a new entry state, a modified entry state, a deleted entry state, and an unmodified entry state. The link-state module, when executed by the set of one or more processors, further causes the network device to determine link-state information to transmit to the peer BGP speaker based on a state assigned to a link/prefix entry and transmit the determined link-state information to the peer BGP speaker.

A non-transitory machine-readable storage medium has computer code stored therein that is to be executed by a set of one or more processors of a network device functioning as a Border Gateway Protocol (BGP) speaker. The computer code, when executed by the network device, causes the network device to perform operations for transmitting aggregated link-state information pertaining to a network in which the network device operates to a peer BGP speaker. The operations include storing, in a link-state database, node entries representing nodes in the network, fragment entries representing fragments received from nodes in the network, and link/prefix entries representing links/prefixes in the network. Each node entry is associated with a set of fragment entries and each fragment entry is associated with a set of link/prefix entries. Each fragment entry and link/prefix entry is assigned a version number and each link/prefix entry is assigned a state from a possible set of states, where the possible set of states include a new entry state, a modified entry state, a deleted entry state, and an unmodified entry state. The operations further include determining link-state information to transmit to the peer BGP speaker based on a state assigned to a link/prefix entry and transmitting the determined link-state information to the peer BGP speaker.

BRIEF DESCRIPTION OF THE DRAWINGS

The invention may best be understood by referring to the following description and accompanying drawings that are used to illustrate embodiments of the invention. In the drawings:

FIG. 2A is a diagram illustrating an exemplary network, according to some embodiments.

FIG. 2B is a diagram illustrating a graphical representation of the link-state information pertaining to the exemplary network as stored in a link-state database, according to some embodiments.

DETAILED DESCRIPTION

Figure 1:
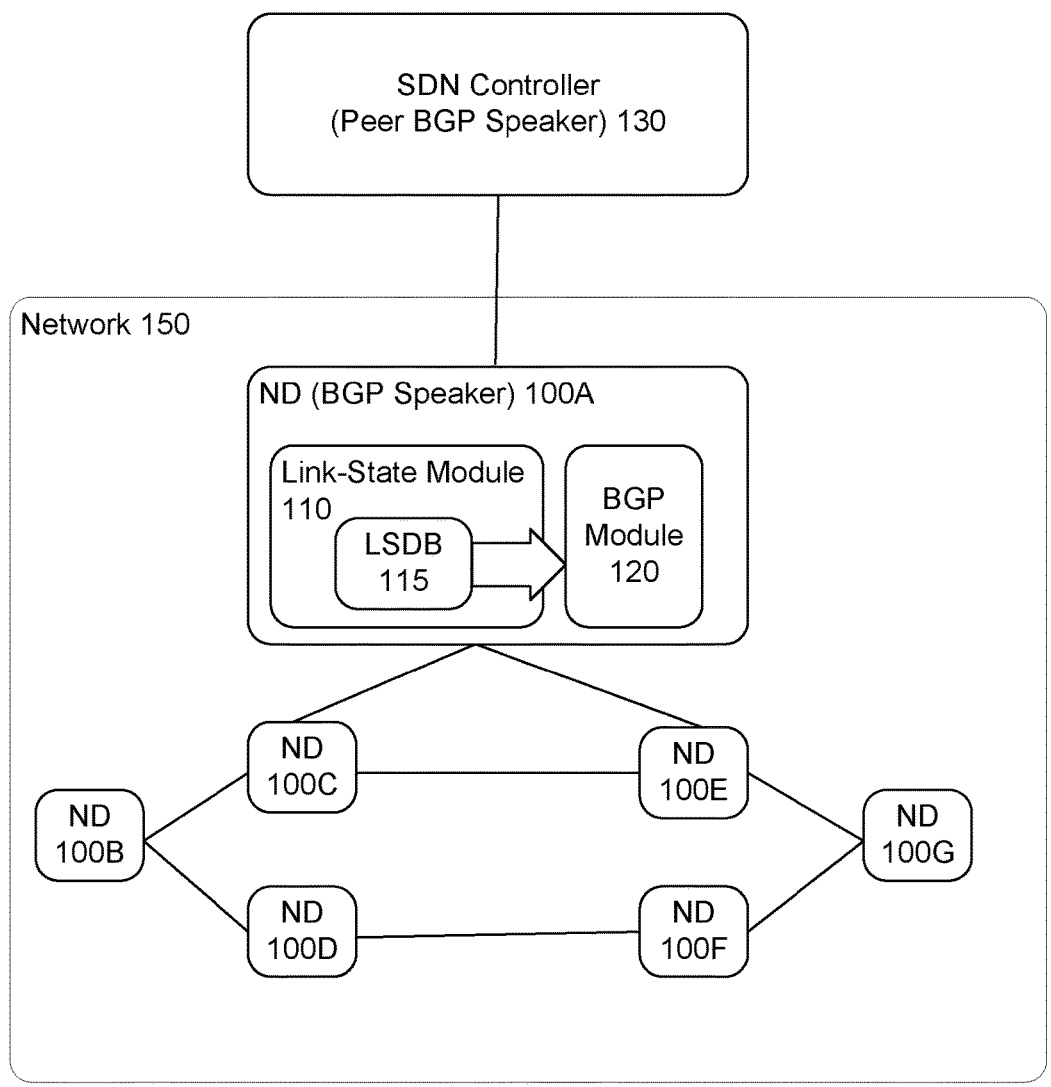
FIG. 1 is a diagram illustrating a system in which aggregated link-state information can be maintained and provided, according to some embodiments.

The following description describes methods and apparatus for maintaining link-state information in a link-state database in a way that allows for efficiently providing aggregated link-sate information via Border Gateway Protocol Link-State (BGP-LS). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

BGP-LS is a protocol that allows a Border Gateway Protocol (BGP) speaker to provide link-state information collected by the BGP speaker to a peer BGP speaker. The BGP speaker may execute a link-state module (e.g., Intermediate System to Intermediate System (IS-IS) daemon) to collect link-state information pertaining to a network in which the BGP speaker operates. The link-state module may collect link-state information by executing IS-IS protocol within the network or through other means. The link-state module may store the collected link-state information in a link-state database (e.g., an IS-IS link-state database). Any time the link-state information in the link-state database changes (e.g., due to updates received via IS-IS), the link-state module may provide updated link-state information reflecting those changes to a BGP module executed by the BGP speaker. The BGP speaker may execute the BGP module (e.g., BGP daemon) to initiate transmission of the updated link-state information provided by the link-state module to the peer BGP speaker via BGP-LS. This serves to keep the peer BGP speaker up-to-date with the latest changes to the network topology and reachability information. However, in situations where the network topology or reachability fluctuates rapidly (e.g., due to a flapping link), the link-state module may end up having to provide an overwhelming number of updates to the BGP module in a short amount of time. In these situations, the BGP module or the peer BGP speaker may not be able to process the updates fast enough (e.g., if they are busy performing other tasks). Due to the time-sensitive nature of network changes, providing updates regarding all of the transient changes that occur while the BGP module or peer BGP speaker was busy may not be that relevant or useful for the peer BGP speaker, especially if those updates arrive at the peer BGP speaker after excessive delay.

Embodiments described herein overcome the disadvantages of existing techniques by maintaining link-state information in a link-state database in a way that allows for efficiently aggregating changes to the link-state information. According to some embodiments, a network device functioning as a BGP speaker stores entries representing nodes, fragments, links, and prefixes in a link-state database. Each node entry is associated with a set of fragment entries and each fragment entry is associated with a set of link/prefix entries. Each fragment entry and link/prefix entry is assigned a version number and each link/prefix entry is assigned a state from a possible set of states. The possible set of states include a new entry state, a modified entry state, a deleted entry state, and an unmodified entry state. According to some embodiments, the network device receives link-state information from other nodes in the network and updates the content of the entries, the version numbers assigned to the entries, and the states assigned to the entries based on the link-state information received from other nodes in the network. The network device determines link-state information to transmit to a peer BGP speaker based on a state assigned to an entry in the link-state database. For example, the network device may determine that link-state information for a link/prefix should be transmitted to the peer BGP speaker if the link/prefix entry representing that link/prefix is assigned the new entry state or the modified entry state. As a further example, the network device may determine that link-state information for deletion of a link/prefix should be transmitted to the peer BGP speaker if the link/prefix entry representing that link/prefix is assigned the deleted entry state. As a further example, the network device may determine that link-state information for a link/prefix should not be transmitted to the peer BGP speaker if the link/prefix entry representing that link/prefix is assigned the unmodified entry state. The network device then transmits the link-state information to the peer BGP speaker (e.g., via BGP-LS). Storing and maintaining link-state information in the link-state database in this way allows the network device to efficiently provide aggregated link-state information (e.g., that reflects the most recent state of the link-state information stored in the link-state database) to a slow consumer (e.g., the peer BGP speaker). Other embodiments are also described and claimed.

FIG. 1 is a diagram illustrating a system in which aggregated link-state information can be maintained and provided, according to some embodiments. The system includes a network 150 and a Software Defined Networking (SDN) controller 130 communicatively coupled to a network device 100A in the network 150. The network 150 includes network devices 100A-G that are communicatively coupled over one or more links. In one embodiment, the network devices 100 are routers. The network devices 100 in network 150 may execute IS-IS protocol to exchange network topology and reachability information with each other.

Network device 100A is communicatively coupled to the SDN controller 130 and includes a link-state module 110 and a BGP module 120. The link-state module 110 is operable to collect and store network topology and reachability information pertaining to the network 150 in a link-state database (LSDB) 115 (e.g., an IS-IS link-state database). The link-state module 110 may collect network topology and reachability information (including traffic engineering (TE) information) pertaining to the network 150 by executing an IS-IS protocol within the network 150 or through other means (e.g., through static configurations or through a Resource Reservation Protocol (RSVP)). The network topology and reachability information pertaining to the network 150 may be referred to herein as link-state information of the network 150. The link-state information may include information regarding nodes, links, and/or prefixes, or any combination thereof. The link-state information stored in the link-state database 115 may be updated as the network topology and/or reachability of the network changes. The link-state module 110 is operable to communicate with the BGP module 120. In one embodiment, the link-state module 110 may communicate with the BGP module 120 using an inter-process communication (IPC) technique. The BGP module 120 is operable to allow the network device 100A to communicate with a peer BGP speaker (e.g., the SDN controller 130) via BGP and/or BGP-LS.

The link-state module 110 is operable to provide updated link-state information pertaining to the network 150 to the BGP module 120. The updated link-state information may indicate, for example, that an attribute of a particular link in the network 150 has changed or that a particular link has been added/removed in the network 150. The BGP module 120 is operable to initiate transmission of the updated link-state information provided by the link-state module 110 to the SDN controller 130 via BGP-LS or similar protocol. In this way the BGP module 120 is operable to relay the updated link-state information provided by the link-state module 110 to a peer BGP speaker (e.g., the SDN controller 130) via BGP-LS or similar protocol. For this purpose, the network device 100A may be regarded as the BGP speaker and the SDN controller 130 may be regarded as a peer BGP speaker of network device 100A. In one embodiment, the network device 100A functions as a BGP route reflector for the network 150.

In one embodiment, the link-state module 110 stores, in a link-state database 115, node entries representing nodes in the network 150, fragment entries representing fragments received from nodes in the network 150, and link/prefix entries representing links/prefixes in the network 150. Each node entry is associated with a set of fragment entries and each fragment entry is associated with a set of link/prefix entries. Each fragment entry and link/prefix entry is assigned a version number and each link/prefix entry is assigned a state from a possible set of states. The possible set of states include a new entry state, a modified entry state, a deleted entry state, and an unmodified entry state. According to some embodiments, the network device 100A receives link-state information from other nodes (e.g., network devices 100B-G) in the network 150 and the link-state module 110 updates the content of the entries, the version numbers assigned to the entries, and the states assigned to the entries based on the link-state information received from other nodes in the network 150. The network device 100A determines link-state information to transmit to the SDN controller 130 based on a state assigned to an entry in the link-state database 115. For example, the link-state module 110 may determine that link-state information for a link/prefix should be transmitted to the SDN controller 130 if the link/prefix entry representing that link/prefix is assigned the new entry state or the modified entry state. As a further example, the link-state module 110 may determine that link-state information for deletion of a link/prefix should be transmitted to the SDN controller 130 if the link/prefix entry representing that link/prefix is assigned the deleted entry state. As a further example, the link-state module 110 may determine that link-state information for a link/prefix should not be transmitted to the SDN controller 130 if the link/prefix entry representing that link/prefix is assigned the unmodified entry state. The link-state module 110 then provides the determined link-state information to the BGP module 120. The BGP module 120 may then initiate a BGP-LS transmission of the link-state information to the SDN controller 130. In this way, the network device 100A is able to provide the SDN controller 130 with updated link-state information pertaining to the network 150 via BGP-LS.

As will be further evident from the descriptions provided herein, an advantage of the technique described above is that it allows the link-state module 110 to efficiently aggregate changes to the link-state information. For example, the link-state module 110 may aggregate changes to the link-state information while the BGP module 120 or SDN controller 130 is busy. When the BGP module 120 and/or the SDN controller 130 subsequently becomes available, the link-state module 110 may provide aggregated link-state information to the BGP module 120 (and in turn, to the SDN controller 130) that reflects the most recent state of the link-state information stored in the link-state database 115, instead of providing link-state information for all of the transient changes (which is stale anyways).

It should be noted that the system described with reference to FIG. 1 is provided by way of example and not limitation. It should be understood that in other embodiments, the network 150 can include a different number of network devices 100 and that the network devices 100 can be connected in a different topology than shown in the diagram. Also, it should be understood that network device 100A can perform adaptive flow control of link-state information with a peer BGP speaker other than the SDN controller 130.

FIG. 2A is a diagram illustrating an exemplary network and FIG. 2B is a diagram illustrating a graphical representation of the link-state information pertaining to the exemplary network as stored in a link-state database, according to some embodiments. The exemplary network includes node R1, node N1, and node N2. Each node may be a network device in the exemplary network such as a router. Node R1 has 4 links, node N1 has 3 links, and node N3 has 3 links connected thereto. A simple network topology with only 3 nodes is illustrated here for purpose of clarity and ease of understanding. It should be understood, however, that the techniques described herein are applicable to networks having a different number of nodes and different network topologies.

A link-state database may store link-state information pertaining to the exemplary network. In one embodiment, the link-state database stores link-state information pertaining to the exemplary network as represented in the drawing. Nodes, fragments, links, and prefixes are represented as entries in the link-state database 115. An entry representing a node may be referred to herein as a node entry. An entry representing a fragment may be referred to herein as a fragment entry. An entry representing a link may be referred to herein as a link entry. An entry representing a prefix may be referred to herein as a prefix entry. Link entries and prefix entries may be referred to herein together as link/prefix entries. As shown in the diagram, the link-state database 115 includes node entries representing node R1, node N1, and node N2, respectively. As shown, the node entries are stored as a tree data structure (e.g., a Priority R-Tree) with the node entry representing node R1 as the root of the tree data structure. Each node entry is associated with a set of fragment entries. In this example, the node entry representing node R1 is associated with 3 fragment entries, the node entry representing node N1 is associated with two fragment entries, and the node entry representing node N2 is associated with 5 fragment entries. In one embodiment, the association between a node entry and a set of fragment entries can be established with a pointer from the node entry to the set of fragment entries. Each fragment entry is associated with a set of link entries and/or a set of prefix entries. For example, as shown, the fragment entry representing fragment 0 (associated with the node entry representing node R1) is associated with a set of 4 link entries. The fragment entry representing fragment 0 (associated with the node entry representing node N1) is associated with a set of 3 link entries and a set of 3 prefix entries. The fragment entry representing fragment 0 (associated with the node entry representing node N2) is associated with a set of 3 link entries and a set of 3 prefix entries. The other fragment entries may also be associated with a set of link entries and/or a set of prefix entries, but are not shown here to avoid obfuscating the drawing. In one embodiment, the association between a fragment entry and a set of link entries or prefix entries can be established with a pointer from the fragment entry to the respective set of link entries or prefix entries. In one embodiment, a set of entries (e.g., set of fragment data entries, a set of link entries, or a set of prefix entries) can be stored in a linked list, a radix trie, or in any other suitable data structure.

In one embodiment, each fragment entry and link/prefix entry is assigned a version number. When a fragment is received from a node in the network for the first time, a new fragment entry representing the received fragment is created in the link-state database 115. The new fragment entry is assigned an initial version number (e.g., 0). Also, link/prefix entries representing the respective links/prefixes advertised in the received fragment are created and associated with the new fragment entry. Each of these link/prefix entries are assigned the initial version number. When the same fragment (e.g., having the same fragment ID) is subsequently received from the node, the fragment entry representing that fragment is assigned an updated version number (e.g., by incrementing the previous version number). Also, each link/prefix entry representing a link/prefix advertised in the received fragment is assigned the updated version number. It should be noted, however, that a version number assigned to a link/prefix entry representing a link/prefix that is no longer advertised in the received fragment is not updated.

In one embodiment, each link/prefix entry is assigned a state from a set of possible states. In one embodiment, the set of possible states include a new entry state, a modified entry state, a deleted entry state, and an unmodified entry state. When a new entry is inserted in the link-state database 115, it is assigned the new entry state. When the content of an existing entry (e.g., an attribute of a link/prefix/node) that is assigned the unmodified entry state is modified, it is assigned the modified entry state. If an entry is assigned the new entry state or updated entry state, any further modifications to the content of the entry are made without assigning a new state to the entry. If the content of an entry that is assigned the deleted entry state is modified, it is assigned the modified entry state. Otherwise, if the content of an entry that is assigned the deleted entry state matches the newly received content, then that entry is assigned the unmodified entry state. In one embodiment, an entry can be inferred to be assigned the unmodified entry state if that entry has not been assigned a state.

In one embodiment, if the version number assigned to a link/prefix entry matches the version number assigned to a fragment entry associated with that link/prefix entry and the link/prefix entry is assigned the unmodified entry state, then this indicates that there is no change to the content of that link/prefix entry, and thus the content of that link/prefix entry is still valid. On the other hand, if the version number assigned to a link/prefix entry lags behind the version number assigned to a fragment entry associated with that link/prefix entry, then this indicates that the most recent fragment did not advertise link-state information for the link/prefix (implying that the link/prefix should be deleted), and thus the link/prefix entry is assigned the deleted entry state.

Figure 3A:
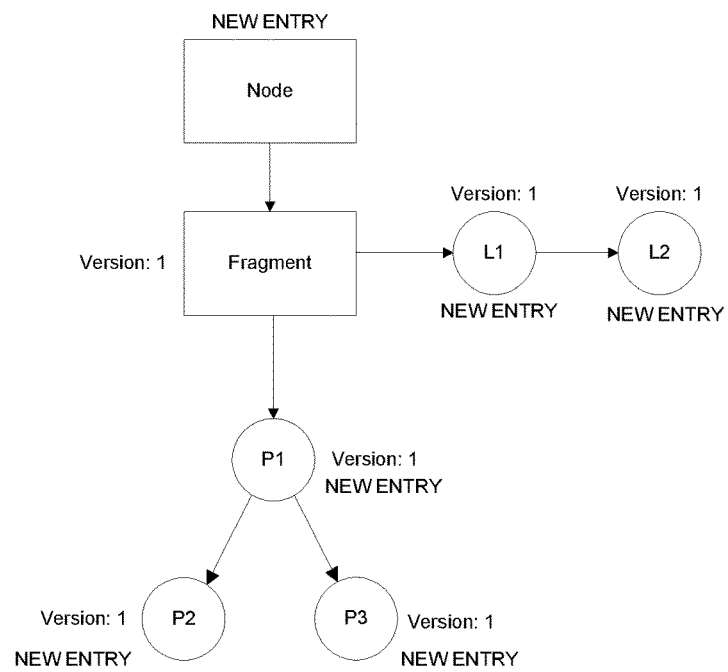
FIG. 3A is a diagram illustrating a graphical representation of link-state information stored in a link-state database after processing a fragment for the first time, according to some embodiments.

FIG. 3A is a diagram illustrating a graphical representation of link-state information stored in a link-state database after processing a fragment for the first time, according to some embodiments. In this example, assume a processing node receives a fragment from a node for the first time. The received fragment advertises link-state information for prefixes P1, P2, and P3, as well as links L1 and L2. In one embodiment, the fragment is a link-state protocol data unit (LSP) fragment. In one embodiment, link-state information for prefixes may be included in Type Length Value (TLV) 135/235/236/237 of an LSP fragment. In one embodiment, link-state information for links may be included in TLV 22/222/223 of an LSP fragment.

The processing node may store link-state information in its link-state database 115 as represented in the drawing. Since this is the first time receiving a fragment from the node, the fragment entry representing the received fragment and all of the link/prefix entries associated with the fragment entry are assigned a version number of 1. Also, since the node entry representing the node and all of the link/prefix entries have been created for the first time, they are all assigned the new entry state. When the link-state module 110 of the processing node traverses the link-state database 115, it will determine that link-state information for the node and all of the links/prefixes should be provided to the BGP module 120 of the processing node for eventual transmission to a peer BGP speaker based on seeing the new entry state. After providing this link-state information to the BGP module 120, the states assigned to all of the entries are reset (e.g., to the unmodified entry state).

Figure 3B:
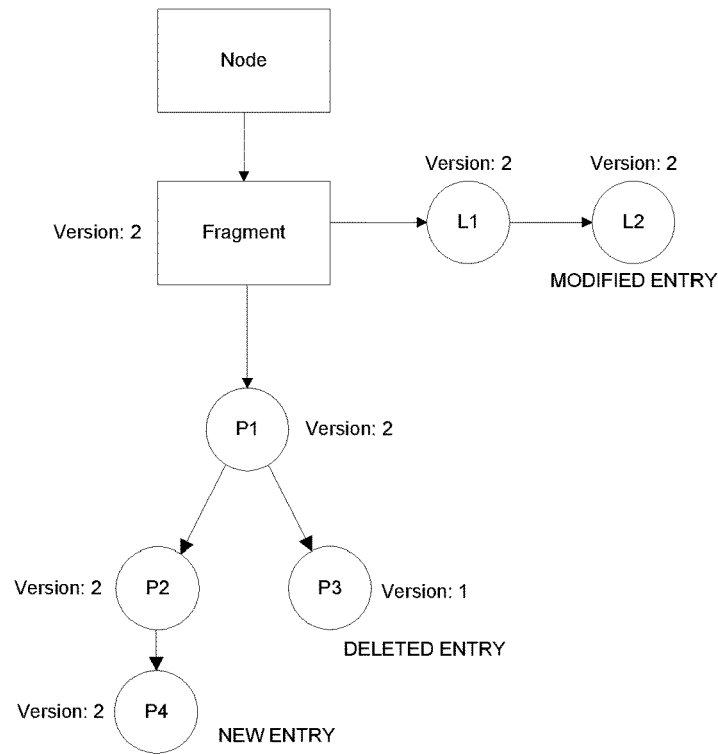
FIG. 3B is a diagram illustrating a graphical representation of link-state information stored in a link-state database after processing a further fragment, according to some embodiments.

FIG. 3B is a diagram illustrating a graphical representation of link-state information stored in a link-state database after processing a further fragment, according to some embodiments. In this example, assume that the processing node subsequently receives another fragment (having the same fragment ID as the previous fragment) from the same node. The received fragment advertises link-state information for prefixes P1, P2, and P4, as well as links L1 and L2, where an attribute of link L2 has changed.

As a result, a new prefix entry representing prefix P4 is created in the link-state database. This prefix entry is assigned the new entry state since it has been created for the first time. Also, the content of the link entry representing link L2 is updated with the updated attribute of link L2 received in the fragment. This link entry is assigned the modified entry state since its content has been modified. The fragment entry representing the received fragment is assigned an updated version number (version number 2 in this example). The entries representing link L1, link L2, prefix P1, prefix P2, and prefix P4 are also assigned the updated version number (version number 2 in this example) since the received fragment advertises link-state information for these links/prefixes. However, it should be noted that the version number assigned to the prefix entry representing prefix P3 is not updated (but remains at version number 1) since link-state information for prefix P3 was not included in the received fragment. Since the version number assigned to the prefix entry representing prefix P3 lags behind the version number of the fragment entry associated with that prefix entry, the prefix entry is assigned the deleted entry state.

When the link-state module 110 of the processing node traverses the link-state database 115, it will determine that link-state information for prefix P4 and link L2 should be provided to the BGP module 120 of the processing node for eventual transmission to a peer BGP speaker based on seeing the new entry state and the modified entry state, respectively. Also, the link-state module 110 will determine that link-state information for the deletion of prefix P3 should be provided to the BGP module 120 based on seeing the deleted entry state. Link-state information for the node and the other links and prefixes will not be provided to the BGP module 120 since the entries representing these links/prefixes are assigned the unmodified entry state. After providing the link-state information to the BGP module 120, the states assigned to all of the entries are reset (e.g., to the unmodified entry state).

An embodiment of the conditions for assigning the various possible states are summarized below.

New entry state is assigned to an entry when the entry is created for the first time.

Modified entry state is assigned to an entry when a content of the entry changes and the version number assigned to the entry matches the version number assigned to the parent entry (e.g., a fragment entry associated with a link/prefix entry is a parent entry of the link/prefix entry).

Deleted entry state is assigned to an entry when a version number assigned to the entry lags behind the version number of the parent entry (e.g., a fragment entry associated with a link/prefix entry is a parent entry of the link/prefix entry).

Unmodified entry state is assigned to an entry when the version number assigned to the entry matches the version number assigned to the parent entry (e.g., a fragment entry associated with a link/prefix entry is a parent entry of the link/prefix entry) and no other states have been assigned to the entry.

In some situations, link-state information for a particular prefix/link advertised by a given node can move from one fragment to another. This can cause problems where an entry representing a link/prefix is deleted because that link/prefix is no longer advertised in the same fragment, even though that link/prefix is advertised in another fragment. An exemplary scenario where this problem occurs is described with reference to FIG. 4A and FIG. 4B.

Figure 4A:
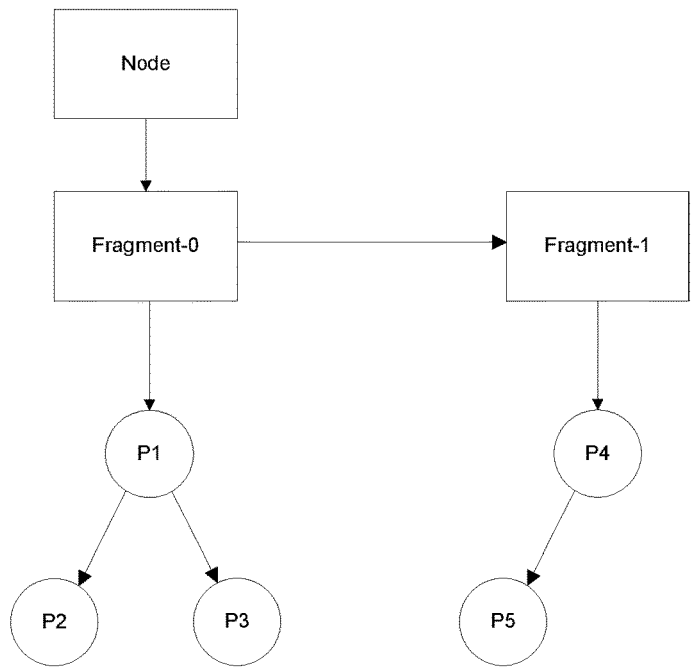
FIG. 4A is a diagram illustrating a graphical representation of link-state information stored in a link-state database at time $t_1$, according to some embodiments.

FIG. 4A is a diagram illustrating a graphical representation of link-state information stored in a link-state database at time $t_1$, according to some embodiments. Assume that at time $t_1$, a node advertises two fragments, namely fragment-0 and fragment-1. Fragment-0 advertises prefixes P1, P2, and P3. Fragment-1 advertises prefixes P4 and P5. The link-state information stored in the link-state database at time $t_1$ can be represented by the diagram shown in FIG. 4A.

Figure 4B:
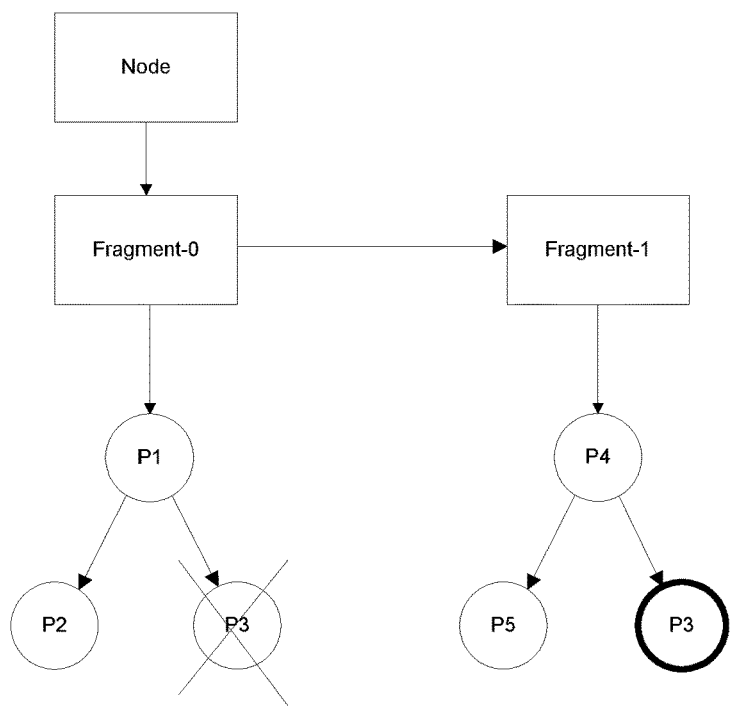
FIG. 4B is a diagram illustrating a graphical representation of link-state information stored in a link-state database at time $t_2$, according to some embodiments.

FIG. 4B is a diagram illustrating a graphical representation of link-state information stored in a link-state database at time $t_2$, according to some embodiments. Assume that at time $t_2$, the same node advertises prefix P3 in fragment-1 instead of fragment-0. The link-state information stored in the link-state database at time $t_2$ can be represented by the diagram shown in FIG. 4B. If the processing node processes fragment-0 before fragment-1, then the processing node would first delete prefix P3 and then add prefix P3 when transmitting link-state information (e.g., to a peer BGP speaker). This sequence does not introduce any problems.

However, if the processing node processes fragment-1 before fragment-0 (e.g., because it received fragment-1 before fragment-0), then the processing node would first add prefix P3 and then delete prefix P3 when transmitting link-state information to a peer BGP speaker, which results in prefix P3 being deleted. In this scenario, prefix P3 is (incorrectly) deleted even though prefix P3 is valid in fragment-1.

In one embodiment, this problem can be solved by maintaining a global link data structure and a global prefix data structure per node, where the global link data structure keeps track of all of the links advertised by a node and the global prefix data structure keeps track of all of the prefixes advertised by a node. These data structures keep track of links/prefixes that span across multiple fragments received from a node. These data structures are maintained in addition to the data structure that stores link-state information for links and prefixes specific to fragments described above. Maintenance of a global prefix data structure and associated operations related to the global prefix data structure will be described below to illustrate how movement of prefixes from one fragment to another fragment can be handled. It should be understood, however, that the descriptions provided below are also applicable in the context of links and the global link data structure to handle movement of links from one fragment to another fragment.

Whenever a fragment with fragment number n is being processed for the first time, the prefixes advertised in that fragment are added to the global prefix data structure. The prefixes are represented as global prefix entries in the global prefix data structure. A global prefix entry representing a prefix is assigned the fragment number of the fragment in which that prefix was advertised (e.g., fragment number n). If a global prefix entry representing a prefix is already present in the global prefix data structure, then the fragment number assigned to that global prefix entry is updated with the fragment number of the fragment in which that prefix was advertised. A global prefix entry can only be deleted from the global prefix data structure if and only if the fragment number being processed matches the fragment number assigned to that global prefix entry in the global prefix data structure. Link-state information for the deletion of the prefix is only provided to the BGP module 120 if the global prefix entry is deleted from the global prefix data structure. Exemplary operations are described below with reference to FIG. 5A and FIG. 5B.

Figure 5A:
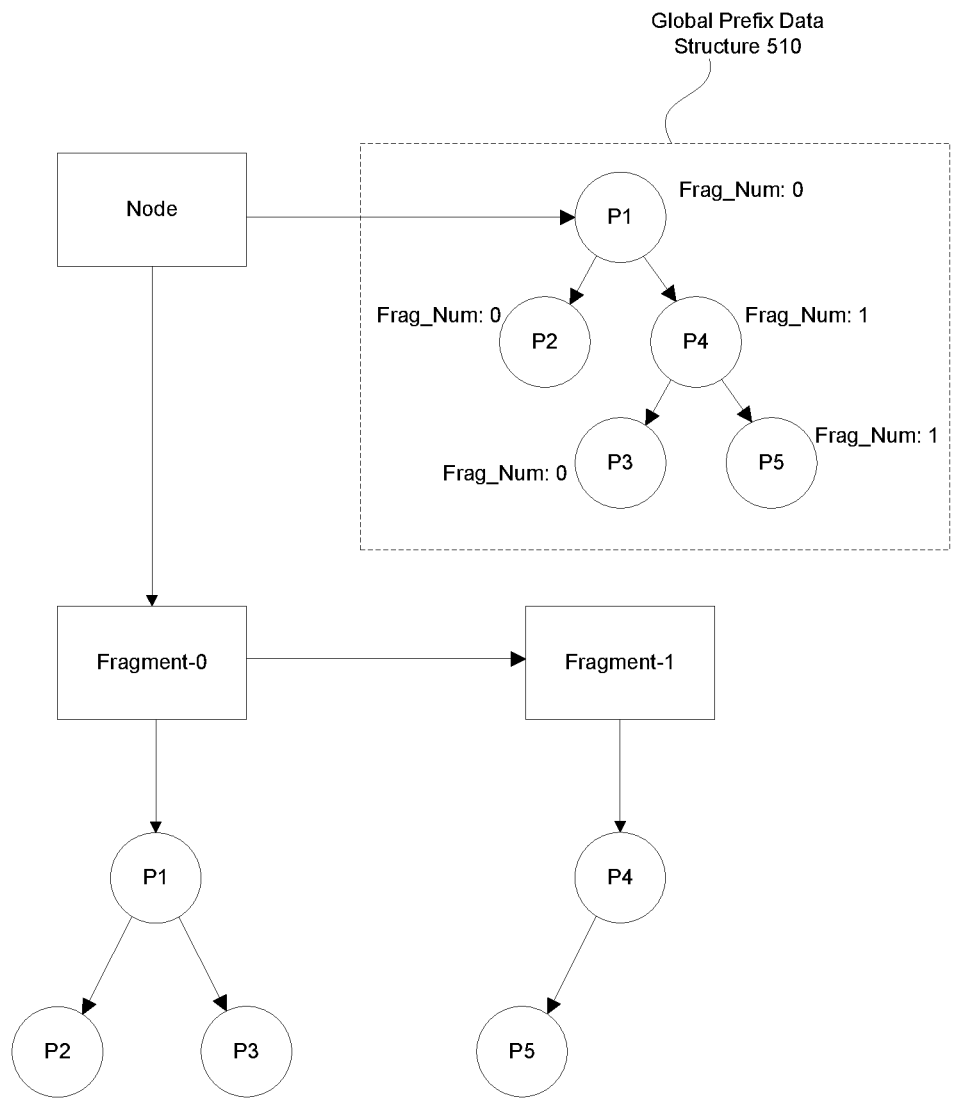
FIG. 5A is a diagram illustrating a graphical representation of link-state information and a global prefix data structure stored in a link-state database at time $t_1$, according to some embodiments.

FIG. 5A is a diagram illustrating a graphical representation of link-state information and a global prefix data structure stored in a link-state database at time $t_1$, according to some embodiments. Re-using the (problematic) example that was described above with reference to FIG. 4A and FIG. 4B, when a processing node processes fragment-0, prefix entries representing prefixes P1, P2, and P3, respectively are created in the link-state database (and associated with fragment-0). Also, global prefix entries representing these prefixes are added to the global prefix data structure 510. Each of these global prefix entries is assigned a fragment number of 0 in the global prefix data structure 510. Similarly, when the processing node processes fragment 1, prefix entries representing prefixes P4 and P5, respectively, are create in the link-state database (and associated with fragment-1). Also, global prefix entries representing these prefixes are added to the global prefix data structure 510. Each of these prefixes is assigned a fragment number of 1 in the global prefix data structure.

Figure 5B:
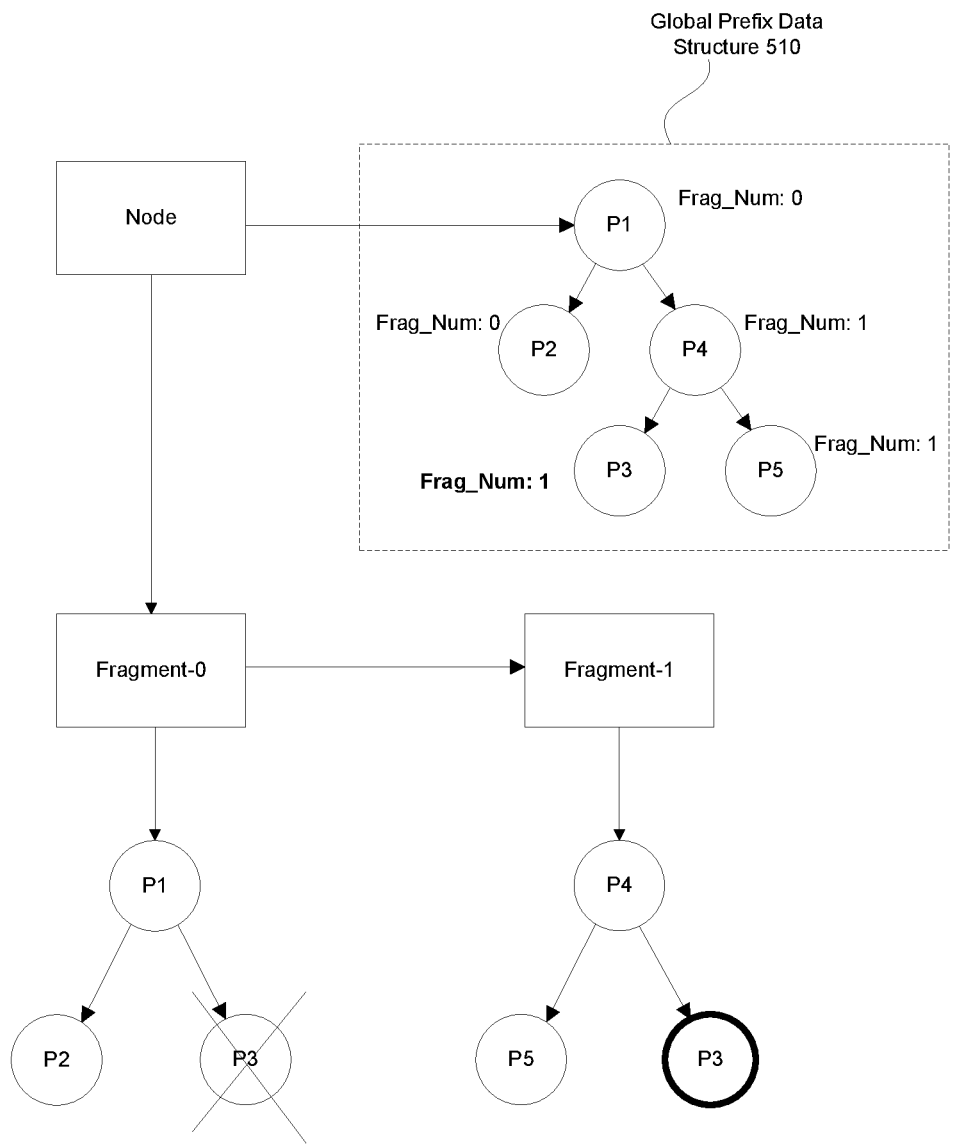
FIG. 5B is a diagram illustrating a representation of link-state information and a global prefix data structure stored in a link-state database at time $t_2$, according to some embodiments.

FIG. 5B is a diagram illustrating a graphical representation of link-state information and a global prefix data structure stored in a link-state database at time $t_2$, according to some embodiments. Re-using the example that was described above with reference to FIG. 4A and FIG. 4B, if a processing node processes fragment-0 before fragment-1, then when processing fragment-0, the processing node would delete the prefix entry representing prefix P3 from the link-state database, as well as remove the global prefix entry representing prefix P3 from the global prefix data structure 510 (since the fragment number of the fragment being processed (fragment 0) matches the fragment number of the global prefix entry representing prefix P3 in the global prefix data structure 510 (fragment 0). As a result, link-state information for the deletion of prefix P3 will be provided to the BGP module 120. When the processing node processes fragment-1, the processing node will create a prefix entry representing prefix P3 in the link-state database (and associate it with fragment-1), as well as add a global prefix entry representing prefix P3 to the global prefix data structure 510. As a result, the processing node will provide link-state information for prefix P3 to the BGP module 120. It should be noted that this sequence of events (processing fragment-0 before fragment-1) did not pose a problem before (in embodiments that did not utilize the global prefix data structure 510). The operations are described here to explain how this scenario would work in an embodiment that utilizes the global prefix data structure 510.

If the processing node processes fragment-1 before fragment-0, then when processing fragment-1, the processing node would create a prefix entry representing prefix P3 in the link-state database (and associate it with fragment-1), as well as update the fragment number assigned to the global prefix entry representing prefix P3 in the global prefix data structure 510 to 1, as shown in the diagram. If there are any changes to the attributes of prefix P3, link-state information for prefix P3 is provided to the BGP module 120. Otherwise, link-state information for prefix P3 is not provided to the BGP module 120 at this time. When the processing node processes fragment-0, the processing node will delete the prefix entry representing prefix P3 (associated with fragment-0) from the link-state database, as shown in the diagram, but will not remove the global prefix entry representing prefix P3 from the global prefix data structure 510. This is because the fragment number of the fragment being processed (fragment number 0) does not match the fragment number assigned to the global prefix entry representing prefix P3 in the global prefix data structure 510 (fragment number 1). As a result link-state information for the deletion of prefix P3 will not be provided to the BGP module 120, and thus prefix P3 will not be deleted. This solves the problem where an entry representing a prefix is deleted because that prefix is no longer advertised in the same fragment, even though that prefix is advertised in another fragment. A similar technique can be used for handling links that move between fragments.

Figure 6:
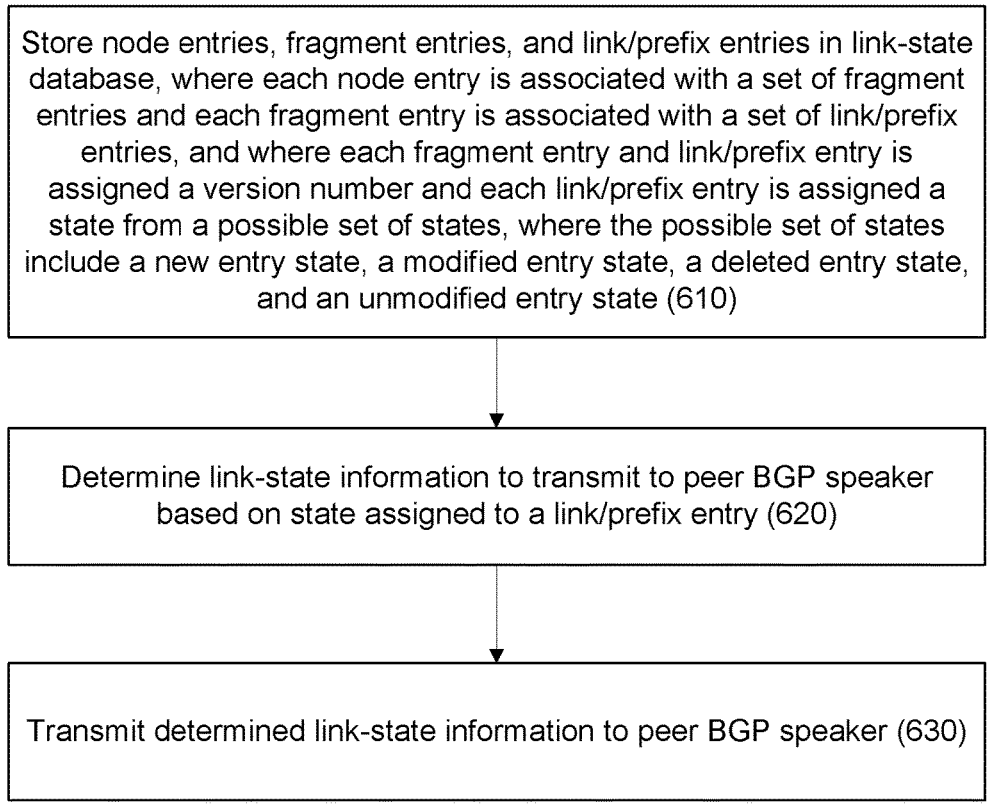
FIG. 6 is a flow diagram of a process for transmitting aggregated link-state information updates to a peer BGP speaker, according to some embodiments.

FIG. 6 is a flow diagram of a process for transmitting aggregated link-state information updates to a peer BGP speaker, according to some embodiments. In one embodiment, the process may be implemented by a network device 100 (e.g., a router). The process may be implemented using hardware, firmware, software, or any combination thereof. The network device 100 may function as a BGP speaker that is connected to a peer BGP speaker. The operations in this flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagram.

The network device 100 stores node entries, fragment entries, and link/prefix entries in a link-state database (block 610). The node entries represent nodes in the network 150, the fragment entries represent fragments received from nodes (e.g., other network devices 100) in the network 150, and the link/prefix entries represent links/prefixes in the network 150. Each node entry is associated with a set of fragment entries and each fragment entry is associated with a set of link/prefix entries. Each fragment entry and link/prefix entry is assigned a version number and each link/prefix entry is assigned a state from a possible set of states. In one embodiment, the possible set of states include a new entry state, a modified entry state, a deleted entry state, and an unmodified entry state.

The network device 100 determines link-state information to transmit to a peer BGP speaker based on a state assigned to a link/prefix entry (block 620). In one embodiment, the network device 100 determines that link-state information for a link/prefix should be transmitted to the peer BGP speaker in response to a determination that a link/prefix entry representing that link/prefix is assigned the new entry state or the modified entry state. In one embodiment, the network device 100 determines that link-state information for deletion of a link/prefix should be transmitted to the peer BGP speaker in response to a determination that a link/prefix entry representing that link/prefix is assigned the deleted entry state. In one embodiment, the network device 100 determines that link-state information for a link/prefix should not be transmitted to the peer BGP speaker in response to a determination that a link/prefix entry representing that link/prefix is assigned the unmodified entry state.

The network device 100 then transmits the determined link-state information to the peer BGP speaker (block 620). In one embodiment, the determined link-state information is transmitted to the peer BGP speaker via BGP-LS.

Figure 7:
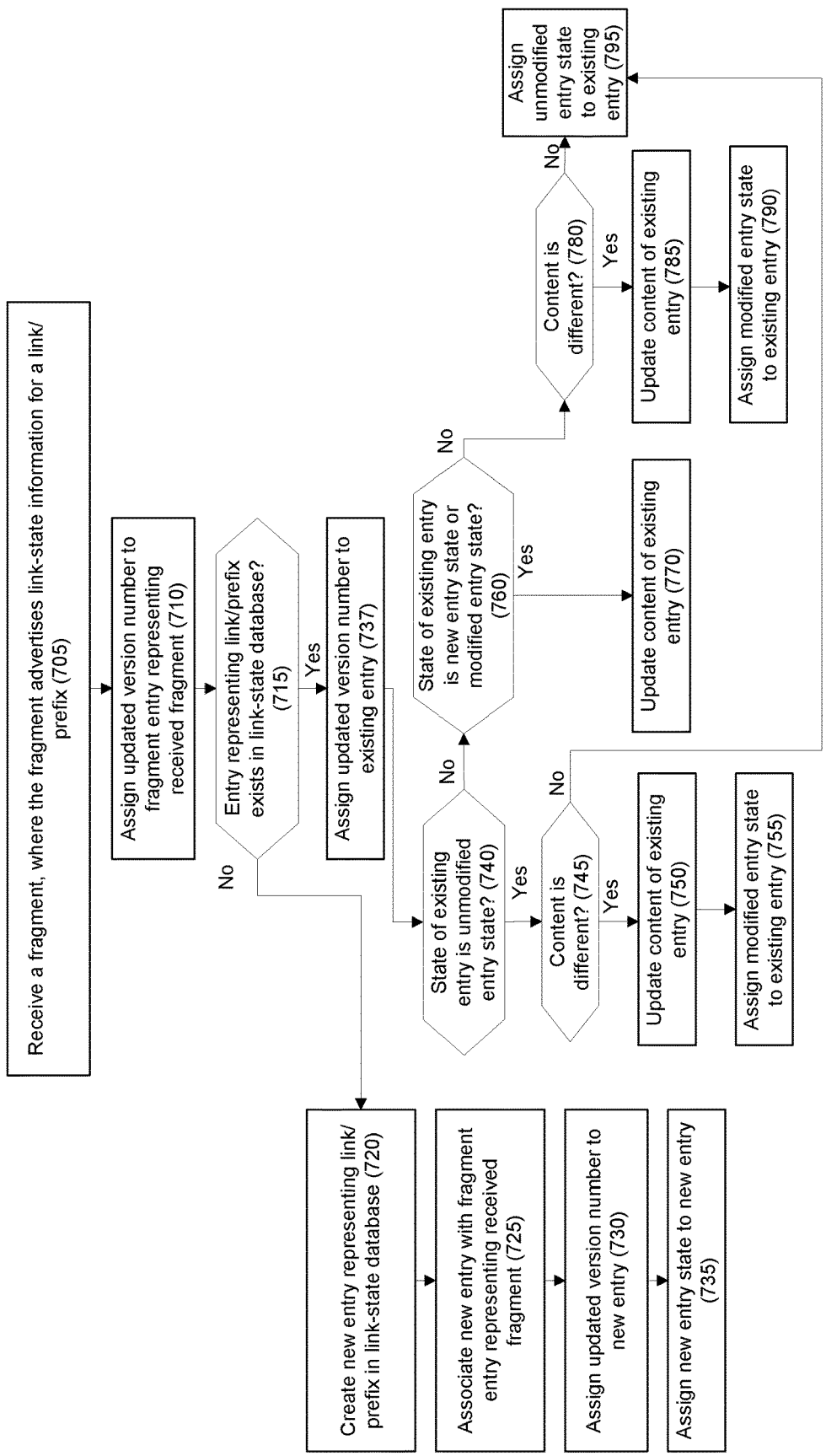
FIG. 7 is a flow diagram of a process for maintaining link-state information in a link-state database, according to some embodiments.

FIG. 7 is a flow diagram of a process for maintaining link-state information in a link-state database, according to some embodiments. In one embodiment, the process may be implemented by a network device 100 (e.g., a router). The process may be implemented using hardware, firmware, software, or any combination thereof.

In one embodiment, the process is initiated when the network device 100 receives a fragment, where the fragment advertises link-state information for a link/prefix (block 705). In one embodiment, the fragment is an LSP.

If a fragment entry representing the received fragment already exists in the link-state database 115, then the network device 100 assigns an updated version number to the fragment entry representing the received fragment (block 710). If a fragment entry representing the received fragment does not already exist in the link-state database 115, then a new fragment entry is created in the link-state database 115 and the network device 100 assigns an initial version number to the new fragment entry (not illustrated).

The network device 100 determines whether an entry (e.g., link/prefix entry) representing the link/prefix exists in the link-state database (decision block 715). If not, the network device 100 creates a new entry representing the link/prefix in the link-state database (block 720). The network device 100 associates the new entry with the fragment entry representing the received fragment (block 725). The network device 100 assigns the updated version number (the version number assigned to the fragment entry representing the received fragment in block 710) to the new entry (block 730). The network device 100 then assigns the new entry state to the new entry (block 735).

Returning to decision block 715, if an entry (e.g., link/prefix entry) representing the link/prefix exists in the link-state database 115, then the network device 100 assigns the updated version number (the updated version number assigned to the fragment entry representing the received fragment in block 710) to the existing entry (block 737).

The network device 100, then determines whether the state assigned to the existing entry is the unmodified entry state (decision block 740). If so, the network device 100 determines whether the content of the existing entry representing the link/prefix is different from the content of the link-state information for the link/prefix included in the received fragment (decision block 745). If so, then the network device 100 updates the content of the existing entry with the content of the link-state information for the link/prefix included in the received fragment (block 750) and assigns the modified entry state to the existing entry (block 755). Returning to decision block 745, if the content of the existing entry representing the link/prefix is not different from the content of the link-state information for the link/prefix included in the received fragment, then the network device 100 assigns the unmodified entry state to the existing entry (block 795).

Returning to decision block 740, if the state assigned to the existing entry is not the unmodified entry state, then the network device 100 determines whether the state assigned to the existing entry is the new entry state or the modified entry state (decision block 760). If so, then the network device 100 updates the content of the existing entry with the content of the link-state information for the link/prefix included in the received fragment (block 770). There is no need to assign a new state to the existing entry in this case (e.g., to flag that the existing entry has been created or modified) since the existing entry is already assigned the new entry state or the modified entry state.

Returning to decision block 760, if the state assigned to the existing entry is not the new entry state or the unmodified entry state, then this indicates that the state assigned to the existing entry is the deleted entry state. The network device 100 determines whether the content of the existing entry representing the link/prefix is different from the content of the link-state information for the link/prefix included in the received fragment (decision block 780). If so, then the network device 100 updates the content of the existing entry with the content of the link-state information for the link/prefix included in the received fragment (block 785) and assigns the modified entry state to the existing entry (block 790). Returning to decision block 780, if the content of the existing entry representing the link/prefix is not different from the content of the link-state information for the link/prefix included in the received fragment, then the network device 100 assigns the unmodified entry state to the existing entry (block 795).

In one embodiment, the network device 100 maintains a global link/prefix data structure in the link-state database 115. The global link/prefix data structure may be utilized to handle the movement of link-state information between fragments (e.g., as described above with reference to FIG. 5A and FIG. 5B). The network device 100 may store global link/prefix entries representing links/prefixes advertised in the network in the link-state database 115, where each global link/prefix entry is assigned a fragment number.

In one embodiment, the network device 100 may receive a fragment from a node in the network 150, where the fragment advertises link-state information for a link/prefix. In response to receiving the fragment, the network device 100 may determine whether a global link/prefix entry representing the link/prefix exists in the link-state database 115. If not, the network device 100 may create a new global link/prefix entry representing the link/prefix in the link-state database 115 and assign the fragment number of the received fragment to that new global link/prefix entry.

If a global link/prefix entry representing the link/prefix already exists in the link-state database 115, then the network device 100 assigns the fragment number of the received fragment to the existing global link/prefix entry.

In one embodiment, the network device 100 may receive a fragment from a node in the network 150, where the fragment advertises link-state information that indicates that a link/prefix should be deleted. In response to receiving the fragment, the network device 100 may determine whether the fragment number of the received fragment matches the fragment number assigned to the global link/prefix entry representing the link/prefix. If so, the network device 100 may delete the global link/prefix entry representing the link/prefix from the link-state database 115. On the other hand, if the fragment number of the received fragment does not match the fragment number assigned to the global link/prefix entry representing the link/prefix, then the network device 100 does not delete that global link/prefix from the link-state database 115.

Maintaining the link-state information stored in the link-state database 115 in this way allows the network device 100 to keep track of the incremental changes to the link-state information and allows the network device 100 to efficiently provide aggregated link-state information to the peer BGP speaker. For example, when the network device 100 determines that the peer BGP speaker is busy/slow, the network device 100 may hold off on transmitting link-state information to the peer BGP speaker. When the network device 100 determines that the peer BGP speaker is available to process link-state information, then the network device 100 may use the techniques described herein to transmit aggregated link-state information to the consumer that reflects the most recent state of the link-state information stored in its link-state database 115, without transmitting link-state information for all of the transient changes that occurred while the peer BGP speaker was deemed to be busy.

Embodiments have been primarily described in a context where IS-IS is employed as the IGP. However, it should be understood that similar techniques to those described herein can also be applied in a context where Open Shortest Path First (OSPF) or other type of IGP is employed as the IGP. Unlike IS-IS, OSPF typically uses explicit deletes and does not have the concept of fragments. As such, in a context where OSPF is employed as the IGP, the implementation may be simpler since there would be no fragments and no need for the global link/prefix data structure.

Figure 8A:
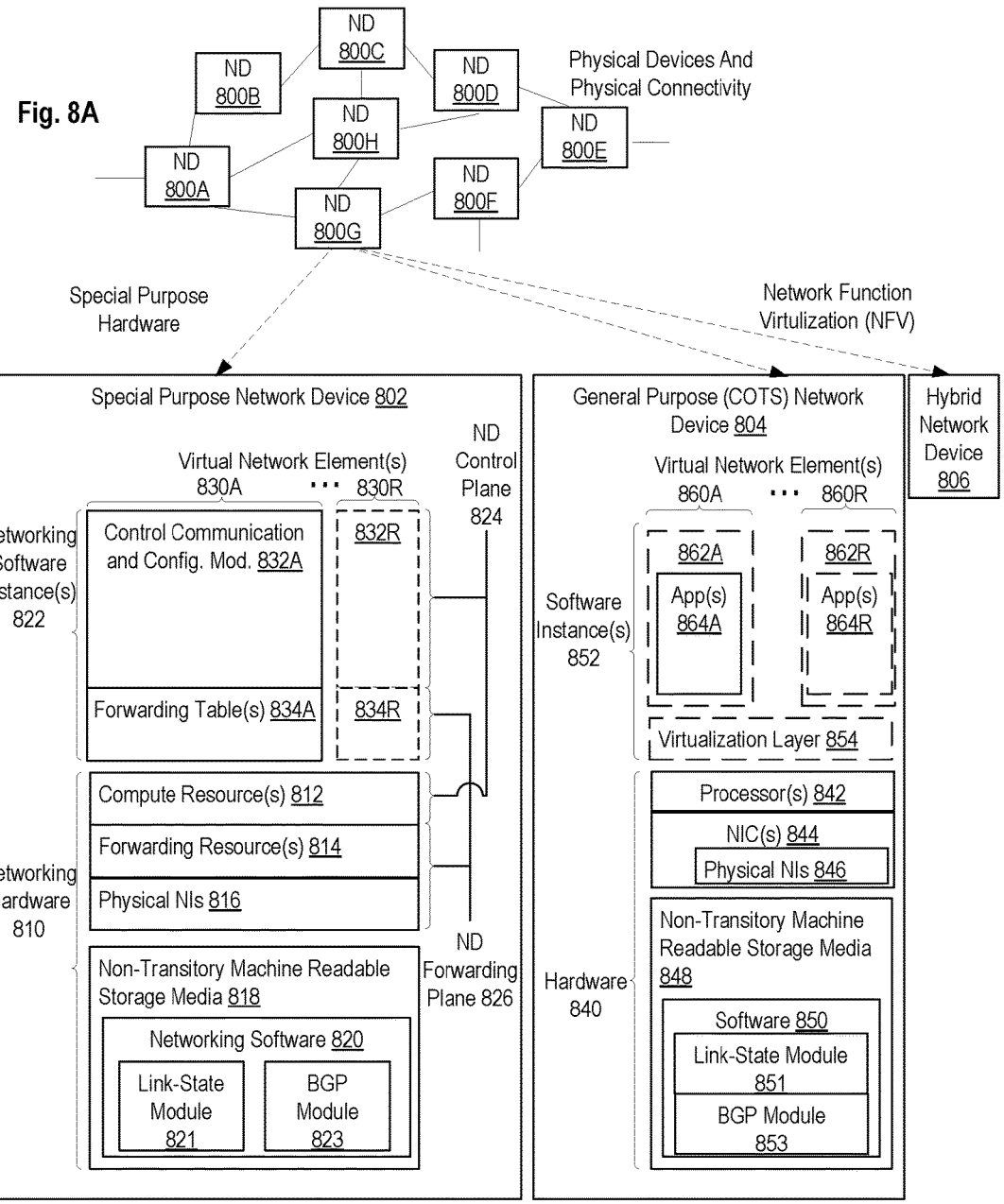
FIG. 8A illustrates connectivity between network devices (NDs) within an exemplary network, as well as three exemplary implementations of the NDs, according to some embodiments.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code such as link-state module 821 and BGP module 823, which when executed by networking hardware 810, causes the special-purpose network device 802 to perform operations of one or more embodiments of the present invention as part networking software instances 822. For example, the link-state module 821 and the BGP module 823, when executed by network hardware 810, may cause the special-purpose network device 802 to perform operations described above with respect to the link-state module 110 and BGP module 120, respectively.

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
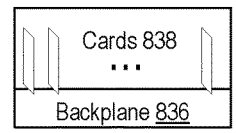
FIG. 8B illustrates an exemplary way to implement a special-purpose network device, according to some embodiments.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R— e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the NIC(s) 844, as well as optionally between the instances 862A-R; in addition, this virtual switch may enforce network isolation between the VNEs 860A-R that by policy are not permitted to communicate with each other (e.g., by honoring virtual local area networks (VLANs)).

Software 850 can include code such as link-state module 851 and BGP module 853, which when executed by processor(s) 842, cause the general purpose network device 804 to perform operations of one or more embodiments of the present invention as part software instances 862A-R. For example, the link-state module 851 and the BGP module 853, when executed by processor(s) 842, may cause the general purpose network device 804 to perform operations described above with respect to the link-state module 110 and BGP module 120, respectively.

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
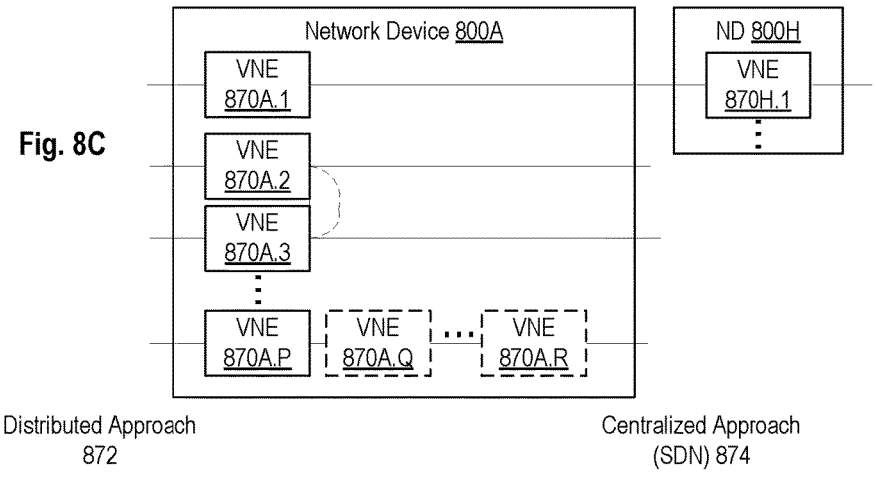
FIG. 8C illustrates various exemplary ways in which virtual network elements (VNEs) may be coupled, according to some embodiments.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service— e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
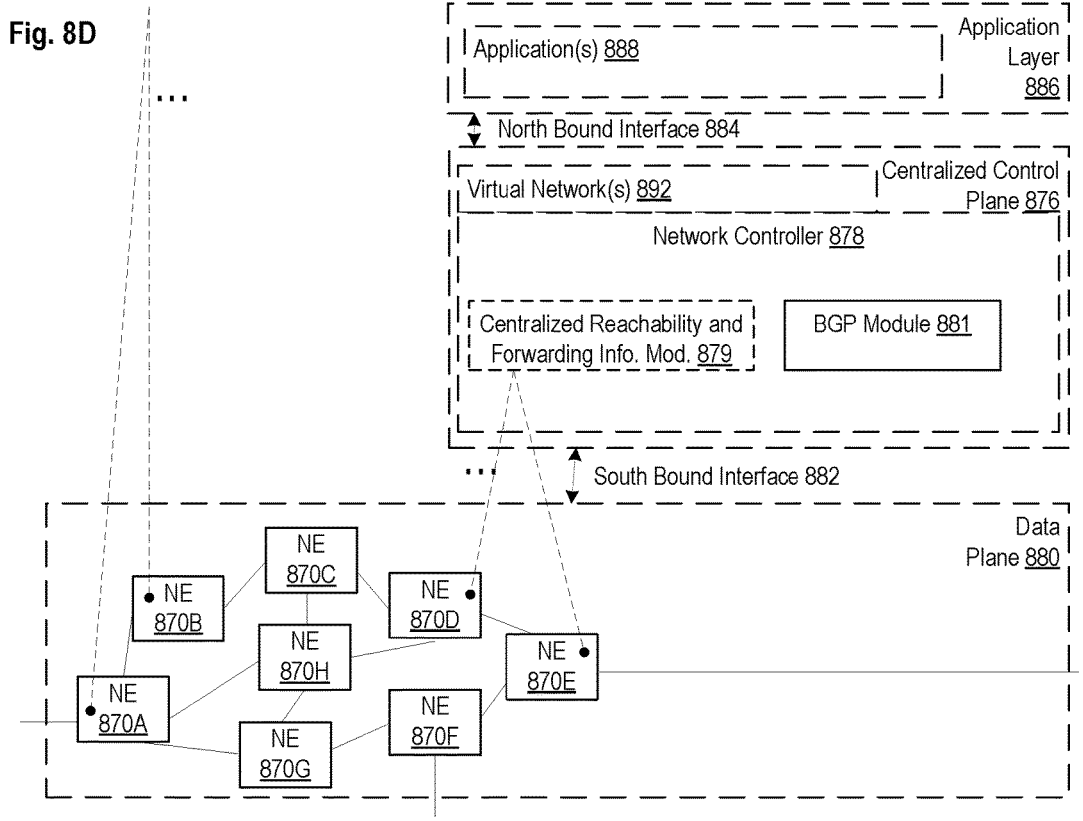
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometimes referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs. In one embodiment, the network controller 878 may include a BGP module 881 that when executed by the network controller 878, causes the network controller 878 to perform operations of one or more embodiments described herein above. For example, the BGP module 881, when executed by the network controller 878, may cause the network controller 878 to perform operations for communicating with one or more NE 870 via BGP-LS.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
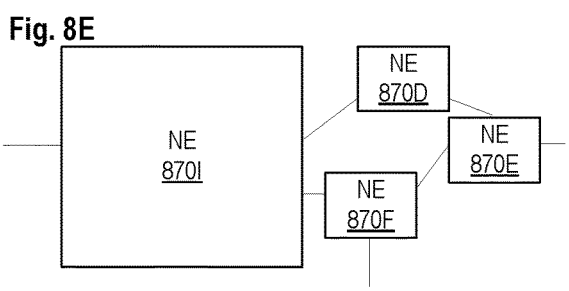
FIG. 8E illustrates the simple case of where each of the NDs implements a single NE, but a centralized control plane has abstracted multiple of the NEs in different NDs into (to represent) a single NE in one of the virtual network(s), according to some embodiments.
Figure 8F:
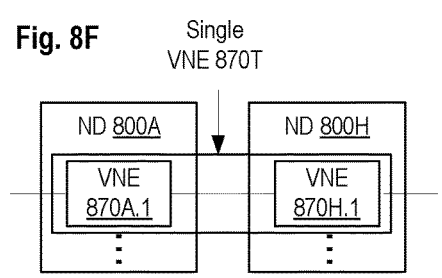
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
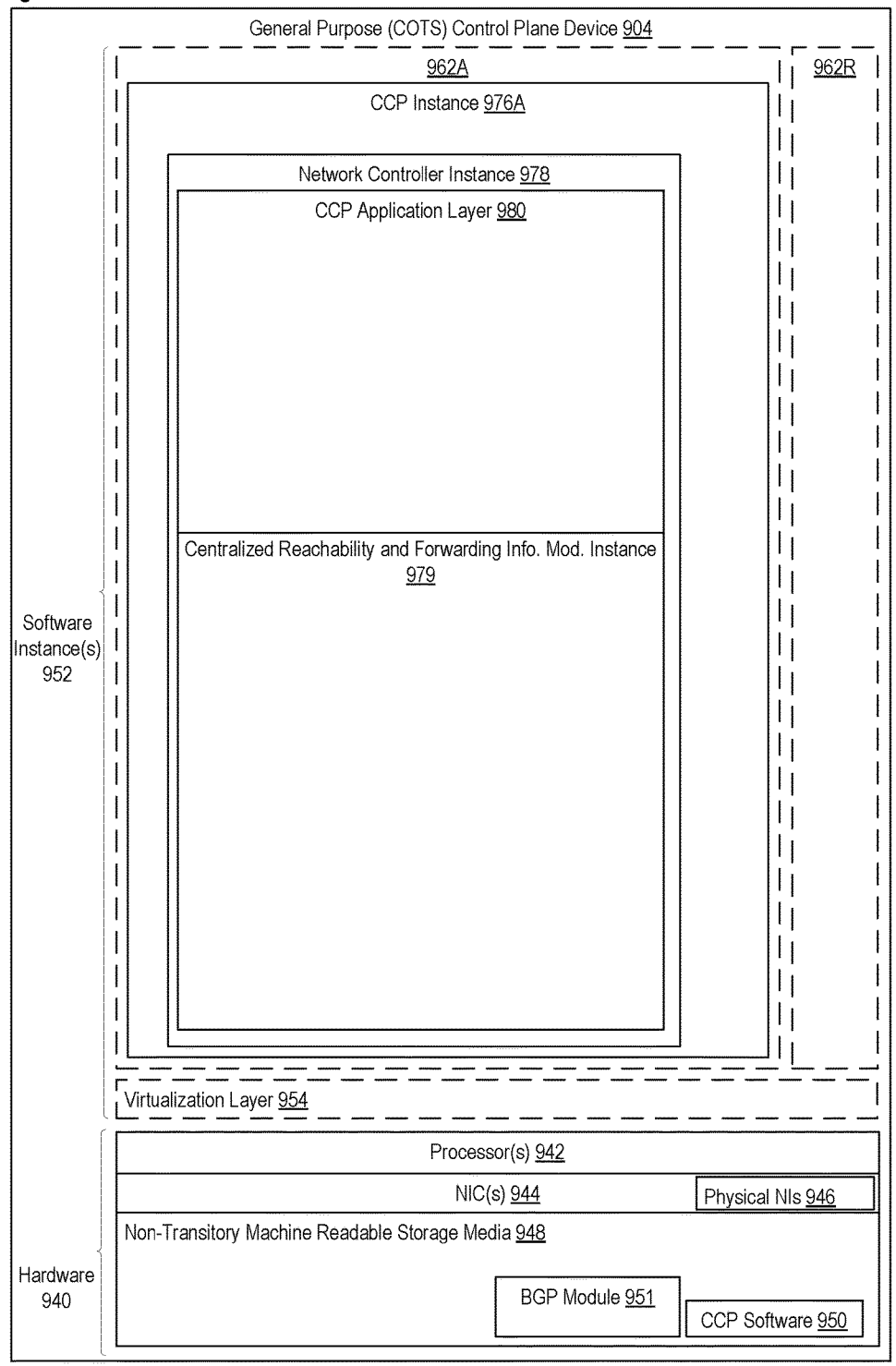
FIG. 9 illustrates a general purpose control plane device with centralized control plane (CCP) software, according to some embodiments.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950 and a BGP module 951.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view.

The BGP module 951 can be executed by hardware 940 to perform operations of one or more embodiments of the present invention as part of software instances 952. For example, the BGP module 951 can be executed by hardware 940 to perform operations for communicating with one or more NEs (e.g., NEs 870A-H) via BGP-LS.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device functioning as a Border Gateway Protocol (BGP) speaker to transmit aggregated link-state information pertaining to a network in which the network device operates to a peer BGP speaker, the method comprising:

storing, in a link-state database, node entries representing nodes in the network, fragment entries representing fragments received from nodes in the network, and link/prefix entries representing links/prefixes in the network, wherein each node entry is associated with a set of fragment entries and each fragment entry is associated with a set of link/prefix entries, and wherein each fragment entry and link/prefix entry is assigned a version number and each link/prefix entry is assigned a state from a possible set of states, wherein the possible set of states include a new entry state, a modified entry state, a deleted entry state, and an unmodified entry state;

determining link-state information to transmit to the peer BGP speaker based on a state assigned to a link/prefix entry; and transmitting the determined link-state information to the peer BGP speaker.

2. The method of claim 1, wherein determining link-state information to transmit to the peer BGP speaker includes determining that link-state information for a link/prefix should be transmitted to the peer BGP speaker in response to a determination that a link/prefix entry representing that link/prefix is assigned the new entry state or the modified entry state.

3. The method of claim 1, wherein determining link-state information to transmit to the peer BGP speaker includes determining that link-state information for deletion of a link/prefix should be transmitted to the peer BGP speaker in response to a determination that a link/prefix entry representing that link/prefix is assigned the deleted entry state.

4. The method of claim 1, wherein determining link-state information to transmit to the peer BGP speaker includes determining that link-state information for a link/prefix should not be transmitted to the peer BGP speaker in response to a determination that a link/prefix entry representing that link/prefix is assigned the unmodified entry state.

5. The method of claim 1, further comprising:
receiving a fragment from a node in the network, wherein the fragment advertises link-state information for a link/prefix;
creating, in the link-state database, a new link/prefix entry representing the link/prefix in response to a determination that a link/prefix entry representing that link/prefix does not exist in the link-state database;
associating the new link/prefix entry representing the link/prefix with a fragment entry representing the received fragment;
assigning an updated version number to the fragment entry representing the received fragment;
assigning the updated version number to the new link/prefix entry representing the link/prefix; and
assigning the new entry state to the new link/prefix entry representing the link/prefix.

6. The method of claim 1, further comprising:
receiving a fragment from a node in the network, wherein the fragment advertises link-state information for a link/prefix;
assigning an updated version number to a fragment entry representing the received fragment;
assigning the updated version number to a link/prefix entry representing the link/prefix;
updating a content of the link/prefix entry representing the link/prefix with a content of the link-state information for the link/prefix included in the received fragment in response to a determination that the content of the link/prefix entry representing the link/prefix is different from the content of the link-state information for the link/prefix included in the received fragment and that the link/prefix entry representing the link/prefix is assigned the unmodified entry state; and
assigning the modified entry state to the link/prefix entry representing the link/prefix.

7. The method of claim 1, further comprising:
receiving a fragment from a node in the network, wherein the fragment advertises link-state information for a link/prefix;
assigning an updated version number to a fragment entry representing the received fragment;
assigning the updated version number to a link/prefix entry representing the link/prefix; and
updating a content of the link/prefix entry representing the link/prefix with a content of the link-state information for the link/prefix included in the received fragment without assigning a new state to the link/prefix entry representing the link/prefix in response to a determination that the link/prefix entry representing the link/prefix is assigned the new entry state or the modified entry state.

8. The method of claim 1, further comprising:
assigning the deleted entry state to a link/prefix entry representing a link/prefix in response to a determination that a version number assigned to the link/prefix entry representing the link/prefix lags behind a version number assigned to a fragment entry associated with the link/prefix entry representing the link/prefix.

9. The method of claim 8, further comprising:
receiving a fragment from a node in the network, wherein the fragment advertises link-state information for the link/prefix;
assigning an updated version number to a fragment entry representing the received fragment;
assigning the updated version number to the link/prefix entry representing the link/prefix; and
assigning the unmodified entry state to the link/prefix entry representing the link/prefix in response to a determination that a content of the link/prefix entry representing the link/prefix matches a content of the link-state information for the link/prefix included in the received fragment and that the link/prefix entry representing the link/prefix is assigned the deleted entry state.

10. The method of claim 8, further comprising:
receiving a fragment from a node in the network, wherein the fragment advertises link-state information for the link/prefix;
assigning an updated version number to a fragment entry representing the received fragment;
assigning the updated version number to the link/prefix entry representing the link/prefix;
updating a content of the link/prefix entry representing the link/prefix with a content of the link-state information for the link/prefix included in the received fragment in response to a determination that a content of the link/prefix entry representing the link/prefix is different from a content of the link-state information for the link/prefix included in the received fragment and that the link/prefix entry representing the link/prefix is assigned the deleted entry state; and
assigning the modified entry state to the link/prefix entry representing the link/prefix.

11. The method of claim 1, wherein the determined link-state information is transmitted to the peer BGP speaker via Border Gateway Protocol Link-State (BGP-LS).

12. The method of claim 1, further comprising:
storing global link/prefix entries representing links/prefixes advertised in the network in the link-state database, wherein each global link/prefix entry is assigned a fragment number.

13. The method of claim 12, further comprising:
receiving a fragment from a node in the network, wherein the fragment advertises link-state information for a link/prefix;
creating, in the link-state database, a new global link/prefix entry representing the link/prefix in response to a determination that a global link/prefix entry representing that link/prefix does not exist in the link-state database; and
assigning a fragment number of the received fragment to the new global link/prefix entry representing the link/prefix.

14. The method of claim 12, further comprising:
receiving a fragment from a node in the network, wherein the fragment advertises link-state information for a link/prefix; and
assigning a fragment number of the received fragment to a global link/prefix entry representing the link/prefix.

15. The method of claim 12, further comprising:
receiving a fragment from a node in the network, wherein the fragment advertises link-state information that indicates that a link/prefix should be deleted; and
deleting a global link/prefix entry representing the link/prefix from the link-state database in response to a determination that a fragment number of the received fragment matches a fragment number assigned to the global link/prefix entry representing the link/prefix.

16. The method of claim 12, wherein link-state information for a link/prefix is transmitted to the peer BGP speaker if a global link/prefix entry representing that link/prefix exists in the link-state database.

17. A network device configured to act as a Border Gateway Protocol (BGP) speaker, the network device to transmit aggregated link-state information pertaining to a network in which the network device operates to a peer BGP speaker, the network device comprising:
a link-state database to store link-state information pertaining to a network in which the network device operates;
a set of one or more processors; and
a non-transitory machine-readable storage medium having stored therein a link-state module, which when executed by the set of one or more processors, causes the network device to store, in the link-state database, node entries representing nodes in the network, fragment entries representing fragments received from nodes in the network, and link/prefix entries representing links/prefixes in the network, wherein each node entry is associated with a set of fragment entries and each fragment entry is associated with a set of link/prefix entries, and wherein each fragment entry and link/prefix entry is assigned a version number and each link/prefix entry is assigned a state from a possible set of states, wherein the possible set of states include a new entry state, a modified entry state, a deleted entry state, and an unmodified entry state, wherein the link-state module, when executed by the set of one or more processors, further causes the network device to determine link-state information to transmit to the peer BGP speaker based on a state assigned to a link/prefix entry and transmit the determined link-state information to the peer BGP speaker.

18. The network device of claim 17, wherein the link-state module, when executed by the set of one or more processors, further causes the network device to receive a fragment from a node in the network, wherein the fragment advertises link-state information for a link/prefix, create, in the link-state database, a new link/prefix entry representing the link/prefix in response to a determination that a link/prefix entry representing that link/prefix does not exist in the link-state database, associate the new link/prefix entry representing the link/prefix with a fragment entry representing the received fragment, assign an updated version number to the fragment entry representing the received fragment, assign the updated version number to the new link/prefix entry representing the link/prefix, and assign the new entry state to the new link/prefix entry representing the link/prefix.

19. A non-transitory machine-readable medium having computer code stored therein, which when executed by a set of one or more processors of a network device acting as a Border Gateway Protocol (BGP) speaker, causes the network device to perform operations for transmitting aggregated link-state information pertaining to a network in which the network device operates to a peer BGP speaker, the operations comprising:
storing, in a link-state database, node entries representing nodes in the network, fragment entries representing fragments received from nodes in the network, and link/prefix entries representing links/prefixes in the network, wherein each node entry is associated with a set of fragment entries and each fragment entry is associated with a set of link/prefix entries, and wherein each fragment entry and link/prefix entry is assigned a version number and each link/prefix entry is assigned a state from a possible set of states, wherein the possible set of states include a new entry state, a modified entry state, a deleted entry state, and an unmodified entry state;
determining link-state information to transmit to the peer BGP speaker based on a state assigned to a link/prefix entry; and
transmitting the determined link-state information to the peer BGP speaker.

20. The non-transitory machine-readable medium of claim 19, wherein the computer code, when executed by the set of one or more processors of the network device, causes the network device to perform further operations comprising:
receiving a fragment from a node in the network, wherein the fragment advertises link-state information for a link/prefix;
creating, in the link-state database, a new link/prefix entry representing the link/prefix in response to a determination that a link/prefix entry representing that link/prefix does not exist in the link-state database;
associating the new link/prefix entry representing the link/prefix with a fragment entry representing the received fragment;
assigning an updated version number to the fragment entry representing the received fragment;
assigning the updated version number to the new link/prefix entry representing the link/prefix; and
assigning the new entry state to the new link/prefix entry representing the link/prefix.

21. The non-transitory machine-readable medium of claim 19, wherein the computer code, when executed by the set of one or more processors of the network device, causes the network device to perform further operations comprising:
receiving a fragment from a node in the network, wherein the fragment advertises link-state information for a link/prefix;
assigning an updated version number to a fragment entry representing the received fragment;

assigning the updated version number to a link/prefix entry representing the link/prefix;

updating a content of the link/prefix entry representing the link/prefix with a content of the link-state information for the link/prefix included in the received fragment in response to a determination that the content of the link/prefix entry representing the link/prefix is different from the content of the link-state information for the link/prefix included in the received fragment and that the link/prefix entry representing the link/prefix is assigned the unmodified entry state; and assigning the modified entry state to the link/prefix entry representing the link/prefix.

22. The non-transitory machine-readable medium of claim 19, wherein the computer code, when executed by the set of one or more processors of the network device, causes the network device to perform further operations comprising:

receiving a fragment from a node in the network, wherein the fragment advertises link-state information for a link/prefix;

assigning an updated version number to a fragment entry representing the received fragment;

assigning the updated version number to a link/prefix entry representing the link/prefix; and updating a content of the link/prefix entry representing the link/prefix with a content of the link-state information for the link/prefix included in the received fragment without assigning a new state to the link/prefix entry representing the link/prefix in response to a determination that the link/prefix entry representing the link/prefix is assigned the new entry state or the modified entry state.

23. The non-transitory machine-readable medium of claim 19, wherein the computer code, when executed by the set of one or more processors of the network device, causes the network device to perform further operations comprising:

assigning the deleted entry state to a link/prefix entry representing a link/prefix in response to a determination that a version number assigned to the link/prefix entry representing the link/prefix lags behind a version number assigned to a fragment entry associated with the link/prefix entry representing the link/prefix.

24. The non-transitory machine-readable medium of claim 23, wherein the computer code, when executed by the set of one or more processors of the network device, causes the network device to perform further operations comprising:

receiving a fragment from a node in the network, wherein the fragment advertises link-state information for the link/prefix;

assigning an updated version number to a fragment entry representing the received fragment;

assigning the updated version number to the link/prefix entry representing the link/prefix; and assigning the unmodified entry state to the link/prefix entry representing the link/prefix in response to a determination that a content of the link/prefix entry representing the link/prefix matches a content of the link-state information for the link/prefix included in the received fragment and that the link/prefix entry representing the link/prefix is assigned the deleted entry state.

25. The non-transitory machine-readable medium of claim 23, wherein the computer code, when executed by the set of one or more processors of the network device, causes the network device to perform further operations comprising:

receiving a fragment from a node in the network, wherein the fragment advertises link-state information for the link/prefix;

assigning an updated version number to a fragment entry representing the received fragment;

assigning the updated version number to the link/prefix entry representing the link/prefix;

updating a content of the link/prefix entry representing the link/prefix with a content of the link-state information for the link/prefix included in the received fragment in response to a determination that a content of the link/prefix entry representing the link/prefix is different from a content of the link-state information for the link/prefix included in the received fragment and that the link/prefix entry representing the link/prefix is assigned the deleted entry state; and assigning the modified entry state to the link/prefix entry representing the link/prefix.

\* \* \* \* \*